Aug. 11, 1931.   J. L. DRAKE   1,818,205
SHEET GLASS DRAWING APPARATUS
Filed June 21, 1928   2 Sheets-Sheet 1
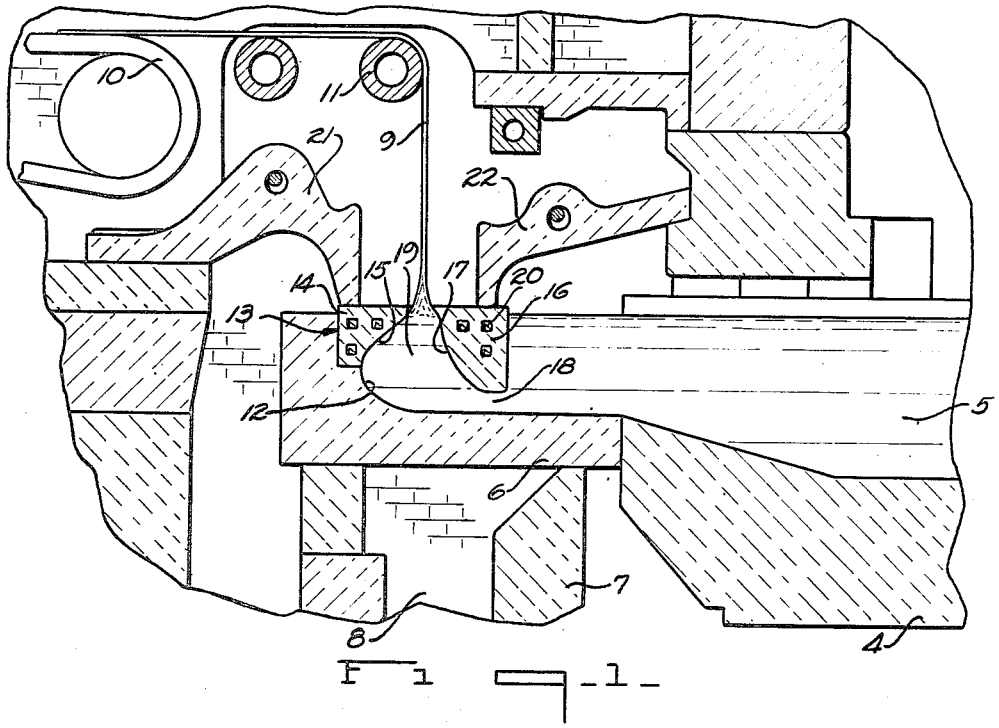
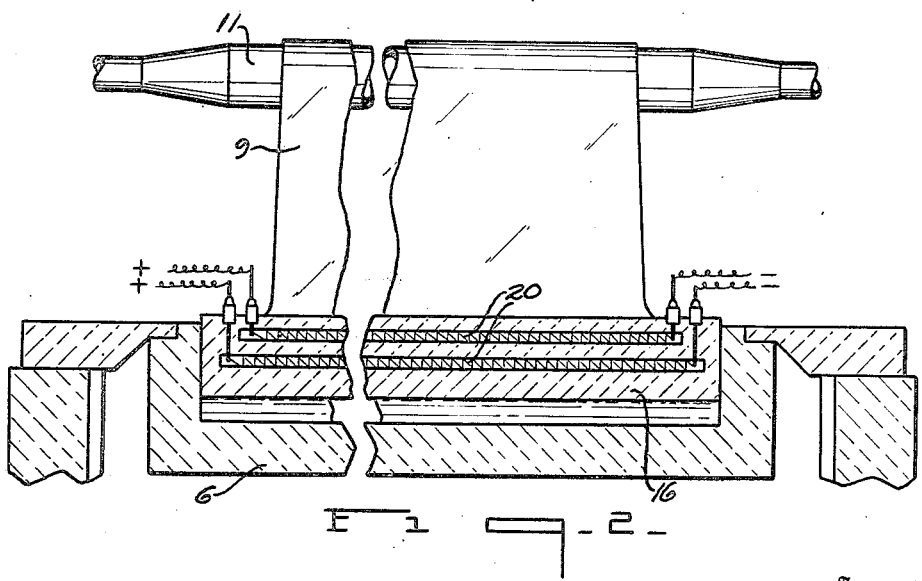
Inventor
John L. Drake
By Frank Fraser
Attorney Aug. 11, 1931.   J. L. DRAKE   1,818,205
SHEET GLASS DRAWING APPARATUS
Filed June 21, 1928   2 Sheets-Sheet 2

Inventor
John L. Drake
By Frank Fraser
Attorney

Patented Aug. 11, 1931

1,818,205

UNITED STATES PATENT OFFICE

JOHN L. DRAKE, OF TOLEDO, OHIO, ASSIGNOR TO LIBBEY-OWENS-FORD GLASS COMPANY, OF TOLEDO, OHIO, A CORPORATION OF OHIO

SHEET GLASS DRAWING APPARATUS

Application filed June 21, 1928. Serial No. 287,143.

This invention relates broadly to the manufacture of glassware and more particularly to the drawing upwardly of glass in sheet form from a bath of molten glass.

The present invention is primarily designed for and finds its greatest utility when incorporated in the Colburn system for drawing sheet glass, although it is naturally not necessarily restricted to this particular field of use. In accordance with the Colburn process, the molten glass is produced in the melting end of a rather long continuous tank furnace, the molten glass being adapted to flow slowly from the melting end of the furnace through the refining and cooling portions or chambers thereof into a relatively shallow working receptacle or pot from which it is drawn upwardly in flat sheet form. In its general aspect, this invention contemplates the provision of means whereby the sheet being drawn will be of a greatly improved quality and which will be, practically speaking, relatively free from impurities and common glass defects.

More specifically, however, the invention involves the utilization of an improved type of draw pot so constructed and designed as to facilitate the drawing of the sheet and improve the quality of the glass going to make up the same. In the past, the draw pots ordinarily employed have been so constructed that there has been a tendency for the glass in certain portions of the pot to become stagnant and this stagnant glass subsequently becoming devitrified would form so-called dog-metal. The presence of this dog-metal is detrimental to the production of a good quality sheet in that particles thereof are very apt to be broken off and drawn into the sheet causing defects therein. With the improved type of draw pot herein provided however, the danger of the molten glass therein becoming stagnant and ultimately devitrified is minimumized, if not entirely elminated, so that the obectionable feature incident to its presence is largely avoided.

Ordinarily, in the Colburn process, the sheet is drawn upwardly from the surface of the molten glass within the draw pot. This surface glass is not always of the best quality for the reason that there is a tendency for a certain amount of dirt, scum or other foreign matter to collect thereupon and should this poor quality of glass be drawn into the sheet, it will naturally cause defects therein. According to the present invention, the sheet is formed from sub-surface glass or, otherwise stated, a sub-surface draw is obtained, which is desirable, for the reason that the sub-surface glass is usually of a somewhat better quality than is the surface glass.

Heretofore, a relatively large portion of the surface area of the molten glass within the draw pot has been exposed to the atmosphere with the result that it would be injuriously effective by disturbing atmospheric conditions and in addition would be exposed to dust, dirt and other foreign matter. The draw pot provided by the present invention is so constructed that a relatively small pool of molten glass is segregated or substantially separated from the main body thereof and it is from this relatively small pool that the sheet is drawn. The molten glass within the pool is substantially protected from dust, dirt and other foreign matter and also from disturbing atmospheric conditions. Moreover, the pool is substantially enclosed so that the heat thereof is retained therein and dissipation of the heat therefrom retarded.

A further object of the invention is to provide means for protecting the sheet being drawn from the fires of the furnace and pot chamber, thus allowing these fires to be run as desired without affecting the sheet, and further, to render possible the elimination of the present sheet coolers which are thought to be the cause of waves in the sheet.

Other objects and advantages of the invention will become more apparent during the course of the following description when taken in connection with the accompanying drawings.

In the drawings forming a part of this application and wherein like numerals are employed to designate like parts throughout the same, Fig. 1 is a vertical longitudinal section through improved apparatus constructed in accordance with the present invention.

Fig. 2 is a transverse section through the draw pot, and

Figure 3:
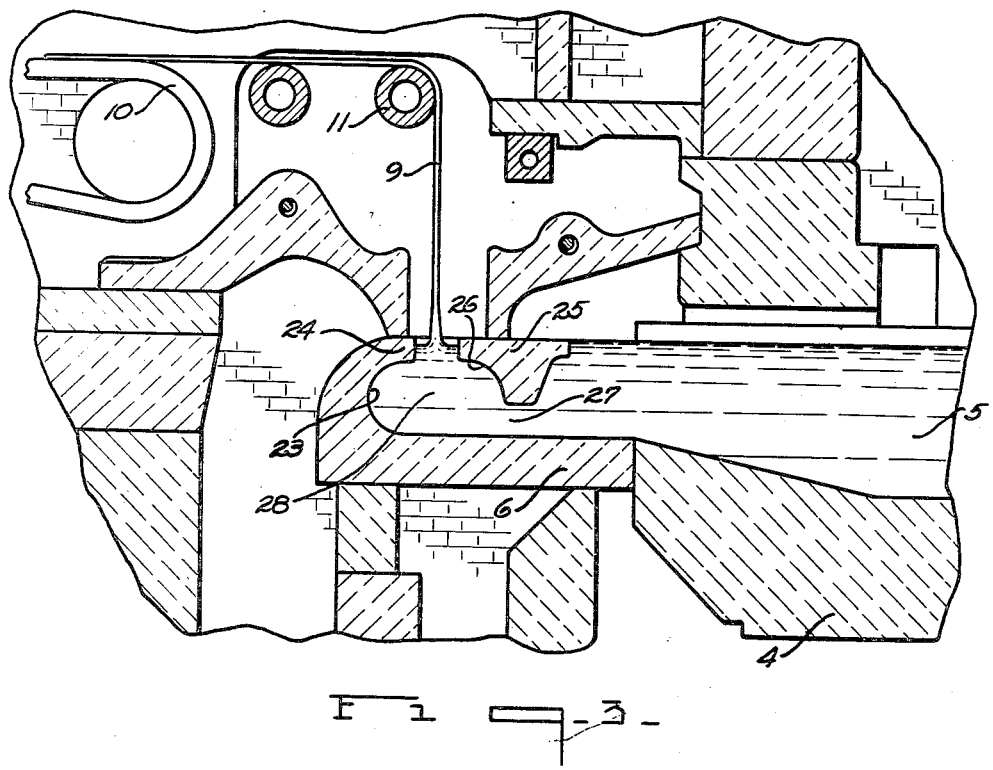
Fig. 3 is a view similar to Fig. 1 but showing a slightly modified construction.

Referring to the drawings, with particular reference to Figs. 1 and 2, the numeral 4 designates the exit end of any suitable type of furnace within which a mass or body of molten glass 5 is adapted to be melted and suitably refined. Connected to and in open communication with the furnace is a relatively shallow receptacle or draw pot 6 adapted to receive the molten glass therefrom, and being supported upon stools 7 above a heating chamber 8. The glass sheet 9 is drawn upwardly from the molten glass within the pot 6 by means of suitable drawing mechanism designated generally at 10, the sheet being initially drawn in a generally vertical direction for a suitable distance and then deflected into the horizontal plane about a bending member or roll 11 and passed horizontally through an annealing leer, not shown. Of course, it will be evident that the sheet may be continued vertically through an annealing leer if desired, instead of being deflected into the horizontal plane as shown.

The present invention consists essentially in the particular construction of the draw pot 6 whereby an improved quality of sheet may be obtained and the above noted objectionable features, usually encountered in the drawing of the sheet, eliminated or at least greatly minimumized. The draw pot herein provided is relatively short and the bottom thereof is curved upwardly at its closed end as indicated at 12. The front end wall of the pot is cut out or recessed as at 13 and removably secured therein is the refractory member or slab 14 which extends the entire width of said pot. The inner face of the member 14 is curved upwardly and inwardly toward the sheet as at 15, forming a substantial continuation of the curved surface 12 of the pot 6.

Immersed within the molten glass opposite to and spaced from the member or slab 14 is a somewhat similar member or slab 16, the inner face thereof being curved upwardly and inwardly as indicated at 17. The lower end of the member 16 is spaced a suitable distance from the bottom of pot 6 to provide a passage 18 through which the molten glass is adapted to flow into the space or chamber defined by the members 14 and 15 to form the pool 19 which is substantially separated or segregated from the main body of the molten glass. Upon an inspection of Fig. 1, it will be apparent that the members 14 and 16 form a chamber therebetween for segregating a relatively small pool of molten glass from the main body, this pool being continuously replenished with sub-surface glass only from the main body, the glass flowing into the pool through passage 18.

The sheet 9 is drawn upwardly from the pool 19, between the members 14 and 16, and since only sub-surface glass is supplied to this pool, the sheet is drawn from sub-surface glass or, otherwise stated, a sub-surface draw is obtained. Such a sub-surface draw is desirable for the reason that the sub-surface glass is of an improved or better quality than is the surface glass, upon which a certain amount of scum, dirt or poor quality of glass tends to collect. The member 16 acts as a floater to prevent this inferior surface glass from passing into the sheet.

By curving the inner surfaces 12, 15 and 17 of the pot 6 and members 14 and 16 respectively in the manner shown, and thus eliminating all sharp angles, the danger of the glass becoming stagnant within the pot and ultimately resulting in the formation of dog-metal therein is eliminated. The surfaces 12, 15 and 17 are curved to substantially conform to the normal path taken by the molten glass as it is drawn upwardly into the sheet so that there is at all times a clean sweep of the molten glass upwardly. The upper ends of the members 14 and 16 are preferably spaced apart a distance sufficient only to allow the sheet to be drawn therethrough. In this manner, the sheet is drawn through a relatively narrow slot and the pool of glass is thus not only protected from disturbing atmospheric conditions but dirt, dust and other foreign matter is prevented from falling therein. The members 14 and 16 may, if desired, be heated by means of electrical heating or resistance elements 20 passing longitudinally therethrough but transversely of the pot. Of course, the members can also be heated in any other suitable manner without departing from the spirit of the invention. The pool of molten glass can consequently be maintained at a desired substantially uniform temperature to assist in the drawing of the sheet. Also, the members serve to substantially enclose the pool of molten glass in order that the heat thereof will be maintained therein and unnecessary dissipation of the heat therefrom prevented.

Arranged at the opposite sides of the sheet 9 are the lip tiles 21 and 22 which serve to protect the sheet, in its vertical run, from heat currents in and around the sheet. It will be noted that the lip tiles rest upon or contact with the members 14 and 16 so as to effectively protect the sheet from heat and gases issuing from the furnace and pot chamber, thus allowing these fires to be run as desired without affecting the sheet. The lip tile 22 will also act to direct the heat currents from the furnace downwardly upon the surface of the molten glass and in this way aid in preventing the glass adjacent the member 16 from becoming devitrified. The arrangement of lip tiles herein provided also renders possible the elimination of usual metallic water coolers which are ordinarily positioned at opposite sides of the sheet to protect the same from the heat and gases issuing from the furnace and pot chamber.

In Fig. 3 is illustrated a somewhat modified construction wherein the member 14 hereinabove described is eliminated, and the front end wall of the pot 6 is recessed or curved as at 23, the same being provided with an inwardly directed overhanding lip 24 which serves to take the place of member 14. Immersed within the molten glass in spaced relation to the lip 24 is a member or slab 25 which is adapted to serve substantially the same purpose as the member 16 described in connection with the preferred form of the invention. This member 25 is provided with an inner curved face 26 and is spaced from the body of the pot to form the passage 27 through which the molten glass passes to supply the pool 28, from which pool the sheet 9 is drawn. The advantages to be gained from the use of this construction are the same as those derived from the use of the preferred form of the invention described hereinabove and illustrated in Figs. 1 and 2.

It is to be understood that the form of the invention herewith shown and described is to be taken as the preferred embodiment of the same, and that various changes in the shape, size and arrangement of parts may be resorted to without departing from the spirit of the invention or the scope of the subjoined claim.

I claim:

In sheet glass drawing apparatus, a receptacle containing a mass of molten glass, a member cooperating with said receptacle for segregating a pool of molten glass from said mass, means for drawing a sheet upwardly from said pool, and lip tiles positioned above the receptacle at opposite sides of the sheet, the lower end of one lip tile resting upon the receptacle and the lower end of the other lip tile resting upon the member cooperating therewith.

Signed at Toledo, in the county of Lucas and State of Ohio, this 13th day of June, 1928.

JOHN L. DRAKE.